US011401996B2

(12) United States Patent
Mokdad et al.

(10) Patent No.: US 11,401,996 B2
(45) Date of Patent: Aug. 2, 2022

(54) INTERNAL COMBUSTION ENGINE

(71) Applicant: Liebherr-Components Colmar SAS, Colmar (FR)

(72) Inventors: Bechir Mokdad, Jebsheim (FR); Yves-Antoine Rogard, Ribeauville (FR)

(73) Assignee: Liebherr-Components Colmar SAS, Colmar (FR)

( * ) Notice: Subject to any disclaimer, the term of this patent is extended or adjusted under 35 U.S.C. 154(b) by 450 days.

(21) Appl. No.: 16/503,152

(22) Filed: Jul. 3, 2019

(65) Prior Publication Data

US 2020/0011397 A1 Jan. 9, 2020

(30) Foreign Application Priority Data

Jul. 4, 2018 (DE) .................... 10 2018 116 214.6

(51) Int. Cl.
| | |
|---|---|
| *F16F 15/26* | (2006.01) |
| *F02B 75/22* | (2006.01) |
| *F16C 3/06* | (2006.01) |
| *F16F 15/28* | (2006.01) |
| *F02B 75/18* | (2006.01) |

(52) U.S. Cl.
CPC ............. *F16F 15/26* (2013.01); *F02B 75/22* (2013.01); *F16C 3/06* (2013.01); *F16F 15/283* (2013.01); *F02B 2075/1848* (2013.01)

(58) Field of Classification Search
CPC ......... F16F 15/283; F16F 15/26; F02B 75/22; F02B 2075/1848; F16C 3/20; F16C 3/06
USPC ...................................................... 123/192.2
See application file for complete search history.

(56) References Cited

U.S. PATENT DOCUMENTS

| | | | | | |
|---|---|---|---|---|---|
| 2,787,907 | A | * | 4/1957 | King ..................... | G01M 1/24 |
| | | | | | 73/462 |
| 3,128,582 | A | * | 4/1964 | Kjelde .................... | B24B 5/428 |
| | | | | | 451/399 |
| 3,835,728 | A | * | 9/1974 | Bernard ................... | F16C 3/20 |
| | | | | | 74/603 |
| 4,779,316 | A | * | 10/1988 | Cherry ..................... | F16C 3/20 |
| | | | | | 74/603 |
| 5,063,892 | A | * | 11/1991 | Maiorana ............... | F02B 75/20 |
| | | | | | 123/192.2 |
| 5,195,398 | A | * | 3/1993 | Murrish ................... | F16C 3/20 |
| | | | | | 123/192.2 |
| 5,237,892 | A | * | 8/1993 | Fry ......................... | F16C 3/06 |
| | | | | | 29/888.08 |

(Continued)

FOREIGN PATENT DOCUMENTS

| | | |
|---|---|---|
| DE | 2034544 A1 | 4/1971 |
| DE | 69006299 T2 | 5/1994 |

(Continued)

*Primary Examiner* — Phutthiwat Wongwian
*Assistant Examiner* — Arnold Castro
(74) *Attorney, Agent, or Firm* — McCoy Russell LLP

(57) ABSTRACT

The present invention provides an internal combustion engine comprising a crankshaft, the crankshaft comprising main bearing journals and cranks for connecting the crankshaft to piston rods of the engine, wherein the crankshaft is provided with counterweights, wherein at least a first counterweight is formed as a separate element and connected to the crankshaft. The present invention is characterized in that at least a second counterweight is formed integrally with the crankshaft.

20 Claims, 8 Drawing Sheets

(56) References Cited

U.S. PATENT DOCUMENTS

| | | | | |
|---|---|---|---|---|
| 5,281,114 A | * | 1/1994 | Bush | F01C 1/023 418/1 |
| 6,698,095 B1 | * | 3/2004 | Assie | B23B 5/18 29/406 |
| 9,273,604 B2 | * | 3/2016 | Goetzke | F16F 15/283 |
| 9,482,307 B2 | | 11/2016 | Britton | |
| 9,657,809 B2 | * | 5/2017 | Pietron | F16F 15/1457 |
| 2003/0221653 A1 | | 12/2003 | Brevick et al. | |
| 2004/0187637 A1 | * | 9/2004 | Gokan | F16C 3/08 74/596 |
| 2009/0000589 A1 | * | 1/2009 | Weinzierl | F02B 75/06 123/192.2 |
| 2014/0041617 A1 | * | 2/2014 | Williams | F16C 3/20 123/192.2 |
| 2014/0041618 A1 | * | 2/2014 | Williams | F16C 9/02 123/195 R |
| 2014/0102248 A1 | * | 4/2014 | Chottiner | F16F 15/26 74/604 |
| 2014/0137835 A1 | * | 5/2014 | Murrish | F16C 3/06 123/197.1 |
| 2016/0146289 A1 | * | 5/2016 | Britton | F16C 3/20 74/574.2 |
| 2017/0089423 A1 | * | 3/2017 | Hucker | F16F 15/322 |

FOREIGN PATENT DOCUMENTS

| | | |
|---|---|---|
| DE | 102013111435 A1 | 4/2014 |
| DE | 102013215242 A1 | 5/2014 |

\* cited by examiner

INTERNAL COMBUSTION ENGINE

CROSS REFERENCE TO RELATED APPLICATIONS

The present application claims priority to German Application No. 10 2018 116 214.6 entitled "AN INTERNAL COMBUSTION ENGINE" filed Jul. 4, 2018. The entire contents of the above-listed application are hereby incorporated by reference for all purpose.

TECHNICAL FIELD

The present application relates to an internal combustion engine comprising a crankshaft, the crankshaft comprising main bearing journals and cranks for connecting the crankshaft to piston rods of the engine, wherein the crankshaft is provided with counterweights.

BACKGROUND AND SUMMARY

There are two main aspects of balancing crankshafts with counterweights. On the one hand, the occurrence of free inertia forces and moments should be avoided, or at least be minimized, as they result in engine vibrations. This is called the global mass balancing. For some engines, a global mass balance is inherent, i.e. automatically guaranteed, if the crankshaft is lengthwise symmetric. In other cases, in particular for non-symmetric crankshafts, counterweights have to be added in order to compensate free inertia forces and moments.

Another aspect of balancing crank trains is the reduction of local forces and moments in the crankshaft. The inertia forces acting locally on the crankshaft cause inner forces and moments in the crankshaft that have to be supported partly by the crankshaft main bearings. The objective of the inner crank train balance is to reduce the local inertia forces, in order to minimize the inner forces and moments in the crankshaft, as well as reduce the main bearing load. The latter allows for a smaller bearing design and a reduced vibration level of the engine block.

Document U.S. Pat. No. 9,482,307 B2 shows a crankshaft according to the preamble of claim 1, wherein the counterweights are formed as separate elements and connected to the crankshaft. In U.S. Pat. No. 9,482,307 B2, there are two basic types of such counterweights, one connected rigidly to the webs of the cranks and one connected in a sliding manner in order to attenuate forces at a tuned order of excitation.

The object of the present invention is to provide an internal combustion engine having improved balancing properties of the crankshaft.

This object is obtained by an internal combustion engine according to the independent claims of the present invention. Various aspects of the present invention are the subject matter of the dependent claims.

In a first aspect, the present invention provides an internal combustion engine comprising a crankshaft, the crankshaft comprising main bearing journals and cranks for connecting the crankshaft to piston rods of the engine, wherein the crankshaft is provided with counterweights, wherein at least a first counterweight is formed as a separate element and connected to the crankshaft. The first aspect is characterized in that at least a second counterweight is formed integrally with the crankshaft.

The integrally formed structure may be integrally formed by forging, casting, and/or 3D printing, for example. In an embodiment, the at least one second counterweight may be formed together with the crankshaft in a common forging process to form a continuous forged metal structure.

The integrally formed components may not have a seam or any additional coupling element, and there may be no adhesive layer. In particular, the integrally formed second counterweight and the web of the crankshaft with which it is integrally formed may be two parts of a single continuous piece of metal.

By using counterweights formed separately, and counterweights formed integrally, on the same crankshaft, the freedom in choosing the masses of the counterweights for the balancing operation is increased, thereby obtaining improved balancing properties, while at the same time the manufacturing costs are kept at an acceptable level.

In an embodiment of the present invention, only one basic type of first counterweights formed as a separate element is used in the engine. This will reduce manufacturing costs. The use of only on basic type of counterweights formed as a separate element is made possible by using, in addition to the first counterweights, second counterweights made integrally with the crankshaft.

A counterweight of only one basic type means that all the first counterweights are made from the same pre-product. Such a pre-product may for example be manufactured by flame cutting or forging.

In a possible embodiment, all the first counterweights have the same mass or are identical.

In an embodiment, the mass of at least one of the first counterweights is modified with respect to another first counterweight by material removal from a common basic type. Thereby, a freedom in choosing different masses also for the first counterweight is provided.

In an embodiment of the present invention, at least two different second counterweights formed integrally with the crankshaft are used in the engine. Because the second counterweights are formed integrally, their shape and mass can be chosen individually for each counterweight.

Optionally, at least two second counterweights have a different mass and/or mass distribution.

In an embodiment of the present invention, at least one counterweight is arranged on the crankshaft with a non-zero angle with respect to a position opposite the crank pin of the corresponding crank. Thereby, in addition to providing counterweights of different mass, the angular position can be used as a degree of freedom in the mass balancing.

Optionally, at least two counterweights are provided on the crankshaft at different, non-zero angles with respect to a position opposite the crank pin of the corresponding crank.

In a second aspect, the present invention provides an internal combustion engine comprising at least 10 cylinders in a cylinder bank, the internal combustion engine further comprising a crankshaft, the crankshaft comprising main bearing journals and cranks for connecting the crankshaft to piston rods of the engine, wherein the crankshaft is provided with counterweights. According to the second aspect, at least two counterweights are provided on the crankshaft at different, optionally non-zero angles with respect to a position opposite the crank pin of the corresponding crank.

Thereby, the angular position of the counterweights can be used as a degree of freedom in the mass balancing of an engine having, due to the number of cylinders in the cylinder bank, a very long crankshaft.

Optionally, the engine has at least 20 cylinders, arranged in a V-configuration. Alternatively, the engine is a linear engine having only one cylinder bank with at least 10 cylinders.

Optionally, in the second aspect, at least two counterweights are provided on the crankshaft at different, non-zero angles with respect to a position opposite the crank pin of the corresponding crank.

Optionally, in the second aspect, at least two counterweights have different masses.

Optionally, in the second aspect, at least two counterweights are provided on the crankshaft at different, non-zero angles with respect to a position opposite the crank pin of the corresponding crank, and have different masses.

The two aspects of the present invention are independent from each other. In particular, the first aspect can be implemented with all the counterweights arranged at the same angle with respect to a position opposite the crank pin of the corresponding crank, and in particular at an angular position that is opposite the crank pin of the corresponding crank. Further, the second aspect may be implemented on a crankshaft having only counterweights made separately or only counterweights formed integrally with the crankshaft.

Optionally, however, the two aspects of the present invention are combined in a single crankshaft.

In the following, possible embodiments, applicable both to the first and the second aspect individually, as well as to their combination, are described.

In an embodiment of the present invention, at least one counterweight is arranged on the crankshaft with an absolute angle with respect to a position opposite the crank pin of the corresponding crank that is larger than 10°, optionally larger than 20°, or optionally larger than 40°.

In an embodiment of the present invention, a difference between the angles at which two counterweights are provided on the crankshaft with respect to a position opposite the crank pin of the corresponding crank is larger than 20°, optionally larger than 40°, or optionally larger than 90°.

In an embodiment of the present invention, at least one counterweight is arranged on the crankshaft with an absolute angle with respect to a position opposite the crank pin between 5° and 25°, or optionally between 10° and 20°, and at least one other counterweight is arranged on the crankshaft with an absolute angle with respect to a position opposite the crank pin between 30° and 80°, optionally between 40° and 70°.

In an embodiment of the present invention, at least two first counterweights each formed as a separate element are connected to the crankshaft at different, optionally non-zero angles with respect to a position opposite the crank pin of the corresponding crank.

In an embodiment of the present invention, at least two second counterweights are formed integrally with the crankshaft at different, optionally non-zero angles with respect to a position opposite the crank pin of the corresponding crank.

In an embodiment of the present invention, a first counterweight formed as a separate element is connected to the crankshaft at a first, optionally non-zero angle with respect to a position opposite the crank pin of the corresponding crank, and at least a second counterweight is formed integrally with the crankshaft at a second, optionally non-zero angle with respect to a position opposite the crank pin of the corresponding crank, wherein the first and the second angle differ from each other.

In an embodiment of the present invention, at least two counterweights having a different mass are provided.

In an embodiment of the present invention, at least one counterweight has a mass that is between 1.5 and 20 times as large as the mass of another counterweight, optionally between 2 and 8 times as large. This large range of masses improves the balancing properties of the crankshaft.

In an embodiment of the present invention, the mass of a first counterweight formed as a separate element is at least between 1.5 and 20 times as large as the mass of a second counterweight formed integrally with the crankshaft, optionally between 2 and 8 times as large. Thereby, the mass of the second counterweights can be kept low, improving the manufacturing properties, while the large masses are provided by first counterweights.

In an embodiment of the present invention, the mass of a two first counterweights each formed as separate elements differs by more than 1% and less than 20%, optionally by more than 3% and less than 12% of the mass of the heavier of the two first counterweights.

Optionally, in this case, the difference in mass is provided by material removal from a common basic counterweight type.

In an embodiment of the present invention, the mass of two second counterweights each formed integrally with the crankshaft differs by more than 1% and/or less than 25%, optionally by more than 4% and/or less than 15% of the mass of the heavier of the two second counterweights.

In an embodiment of the present invention, the first counterweights are fixedly attached to the crankshaft, optionally by screws and/or bolts.

In an embodiment of the present invention, the second counterweights are integrally formed with the crankshaft during the forging process of the crankshaft.

In an embodiment of the present invention, the first counterweights have an outer circumference that is formed in parts by a circular arc, with the center of the arc being arranged at the rotation axis of the crankshaft and the radius being determined by the lowest position of a piston relative to the crankshaft. Therefore, the same basic type of counterweight can be attached at different angular positions with respect to a position opposite the crank pin, without changing the circle of rotation of the circumference of the counterweight.

In an embodiment of the present invention, the circular arc is interrupted by at least one recess for a screw and/or bolt head.

In an embodiment of the present invention, the first counterweights are mirror symmetric with respect to a center plane extending in an radial direction of the crankshaft.

In an embodiment of the present invention, at least one crank has counterweights of the same weight and/or angular position on its two webs. Optionally in an example, there are at least four cranks having counterweights of the same weight and/or angular position on its two webs. Simulations have shown that the balancing properties are improved if at least on some cranks, the two webs of the crank are equipped with the same counterweights.

In an embodiment of the present invention, there is at least one web and/or optionally at least one crank that does not have a counterweight. Optionally, the web and/or crank is arranged at or next to a center plane of the crankshaft. Simulations have shown that the balancing properties are improved if at least one crank or at least one web of a crank is not equipped with a counterweight.

In an embodiment of the present invention, at least one crank has a first web provided with a counterweight and a second web provided without a counterweight or with a counterweight having a different mass and/or angular position, the first and the second web carrying a crank pin. Simulations have shown that the balancing properties are improved if the webs of at least one crank are equipped with different counterweights or only one webs is equipped with a counterweight.

Optionally in this case, the counterweight or counterweights provided on the first/or and second web may be formed integrally with the crankshaft. The integrally formed structure may be integrally formed by forging, casting, and/or 3D printing, for example.

The present invention is optionally applied to engines having an even number of cylinders arranged in a V-configuration, wherein two pistons of a V-segment are connected to the same crank.

The present invention can be applied to crankshafts of both the symmetric and the asymmetric type. Particular advantages are provided for the asymmetric type.

The present invention is optionally applied to engines comprising at least one cylinder bank with at least 6 cylinders, optionally with at least 8 cylinders, for example. In particular, the present invention is optionally applied to engines having at least 12 cylinders in a V-configuration, also including an example of optionally at least 16 cylinders in a V-configuration.

The present invention may be applied to engines having a displacement volume per cylinder between 1 l and 20 l, optionally between 1.5 l and 15 l, or optionally between 2 l and 9 l.

The engine can be of the Diesel and/or of the Otto type. The engine can be a gas engine or an engine using liquid fuel, or both.

The present invention further comprises a crankshaft for an internal combustion engine according to the present invention, as described above.

The present invention further comprises a method for producing a crankshaft of a combustion engine, wherein at least two counterweights of the same basic type are formed as separate elements and connected to the crankshaft. The method is characterized in that in a first step, the mass of at least one of the counterweights is reduced by a predetermined amount with respect to another counterweight of the same basic type by material removal, and in a second step, the unbalance of the crankshaft is measured and removed.

Therefore, according to the method of the present invention, the reduction of the mass of the counterweight is performed before the usual process of removing an unbalance. The amount by which the mass is reduced can be determined by the design of the crankshaft for all crankshafts of this type, and not individually for each crankshaft. In contrast, the removal of an unbalance may be performed individually for each crankshaft.

In an embodiment of the present invention, the mass of at least one of the counterweights is reduced by a predetermined amount by material removal while the counterweight is already attached to the crankshaft. This will simplify production. In particular, before they are attached to the crankshaft, all the counterweights of the same basic type can be manufactured in the same way and/or have the same mass.

In an embodiment of the present invention, the mass of at least one of the counterweights is reduced by a predetermined amount by material removal while the crankshaft is mounted on a measuring station for measuring unbalance. In particular, the material removal of the first step may be done by a removal apparatus that is used in the second step for removing a measured unbalance.

Optionally, the inventive method is used for the manufacture of a crankshaft of the present invention, as described above.

BRIEF DESCRIPTION OF THE DRAWINGS

The present invention will now be described with reference to embodiments and figures.

The figures show the following subject matter:

FIGS. 2-8 are drawn to scale, although other relative dimensions may be used. The figures illustrate component connections, whether direct or indirect, and further illustrate relative spacing and positioning with respect to one another.

DETAILED DESCRIPTION OF THE INVENTION

Figure 1:
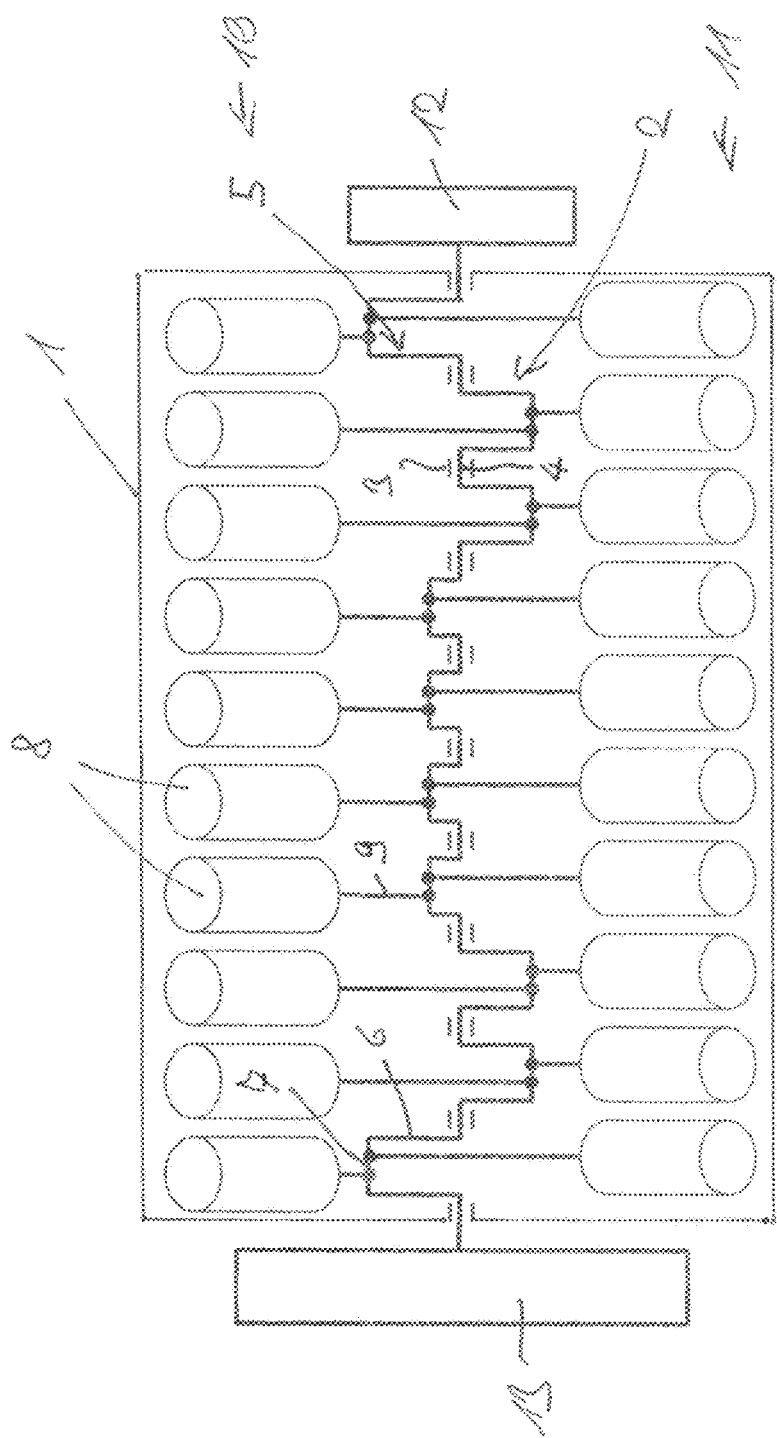
FIG. 1: A schematic drawing showing the general construction of an embodiment of an engine according to the present invention.
Figure 2:
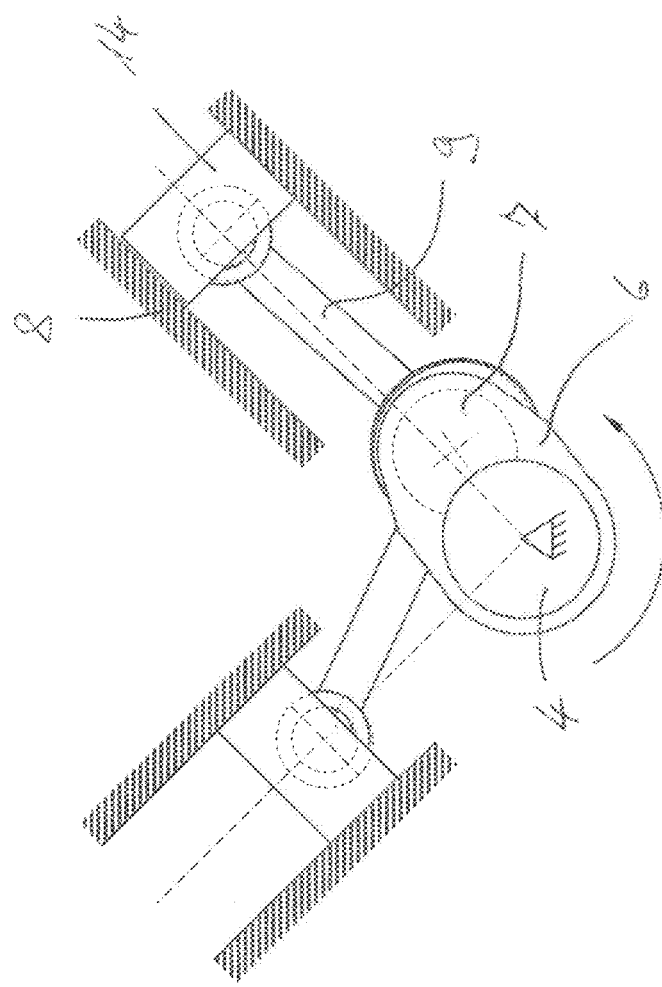
FIG. 2: A cut along a plane perpendicular to the axis of the crankshaft in an embodiment as shown in FIG. 1, FIG. 3: A perspective view of an embodiment of a crankshaft according to the present invention.

FIGS. 1 and 2 show the general construction of an embodiment of an inventive internal combustion engine 1. The internal combustion engine comprises a crankshaft 2, the crankshaft comprising main bearing journals 4 rotationally mounted in main bearings 3 of the engine casing. The crankshaft 2 further comprises cranks 5 for connecting the crankshaft to piston rods 9 of the engine. The piston rods 9 are connected to pistons 14 running in cylinders 8 of the engine. Each crank 5 is formed by two webs 6 carrying a crank pin 7, the crank pin extending in parallel to the axis of the crankshaft. The piston rods 9 are rotationally mounted on the crank pins 7 in order to transform the linear movement of the pistons 14 into a rotational movement of the crankshaft 2.

In the embodiment, each crank 5 is provided between two main bearing journals 4. However, in alternative embodiments, the crankshaft may not be supported between each crank by main bearing. In some embodiments, main bearings and therefore main bearing journals may only be provided at the two ends of the crankshaft. Nevertheless, in the following, all the parts of the crankshaft extending centrically to the axis of the crankshaft will be referred to as main bearing journals.

The crankshaft 2 further carries a rotational vibration damper 12 arranged on one end of the crankshaft, and a fly wheel 13 arranged at the other end of the crankshaft.

In the embodiment shown in FIGS. 1 and 2, the engine has two cylinder banks 10 and 11 arranged in a V-configuration. In this configuration, the two pistons of a V-segment are connected to the same crank, and in particular the piston rods 9 connected to the pistons of a V-segment are rotationally supported on the same crank pin 7. However, we note that the present application is not restricted to engines having a V-configuration, but might equally be applied to engines having a linear or a boxer-type configuration.

FIG. 1 schematically shows an embodiment of a crankshaft having a symmetric configuration, i.e. a crankshaft where the crank orientations are symmetric with respect to a center plane of the crankshaft. However, we note that the present application is not restricted to a symmetric configuration, and in fact provides additional advantages for an asymmetric configuration of the crankshaft, where the balancing of the crankshaft is not only necessary for reducing local forces and moments in the crankshaft, but also for avoiding or at least reducing the free inertia forces and moments. Therefore, the detailed embodiment shown in FIGS. 3 to 8 is a crankshaft of the asymmetric type, i.e. of a type where the angular position of the cranks is asymmetric with respect to a center plane of the crankshaft.

We further note that the embodiment shown in the present application is a 20-cylinder engine, in the embodiment arranged in a V-configuration. However, the present application is not restricted to such an engine or such a number of cylinders, but may equally be applied to internal combustion engines having a lower number or a having a higher number of cylinders. In particular, the present application may equally be applied to engines having 12 or 16 cylinders, in particular to engine having 12 or 16 cylinders arranged in a V-configuration. However, particular advantages are present for engines having at least one cylinder block having at least 10 cylinders.

FIGS. 3 to 8 of the present application show a specific embodiment where all aspects on the present invention are realized in combination. However, we note that the several aspects of the present invention, described with respect to the embodiment, may equally be applied on their own.

According to a first aspect of the present application, the crankshaft is provided with first counterweights 20, formed as separate elements and connected to the crankshaft, and with second counterweights 21 formed integrally with the crankshaft.

Figure 5:
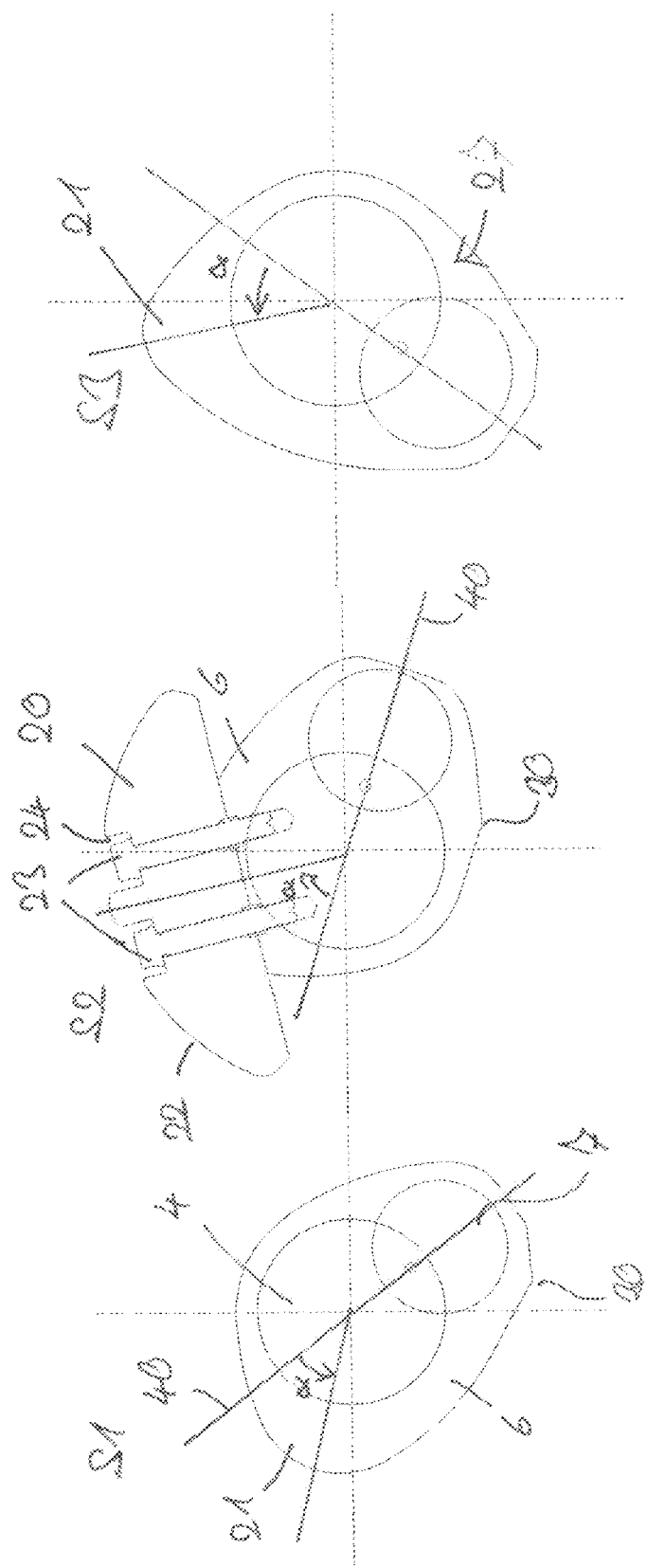

In particular, as can be seen for example in cut S2 in FIG. 5, the first counterweights 20 are formed as separate elements, connected to the webs 6 of the crankshaft by bolts or screws 23.

In the embodiment, the first counterweights 20 have at least one opening, traversing the counterweight in a direction parallel to a radial direction, through which a screw or bolt 23 is reaching. The screw or bolt 23 is reaching through the counterweight is connected to a web 6 of a crank. For this purpose, the web has a corresponding opening, optionally provided with a screw thread, for receiving the screw or bolt 23. In the specific embodiment two such screws or bolts 23 are used for connecting a counterweight 20 to the crankshaft.

The first counterweights 20, formed as a separate elements with respect to the crankshaft, can for example manufactured by flame cutting, or by forging.

Further, the first counterweights 20, formed as separate elements with respect to the crankshaft, are optionally connected fixedly to the crankshaft, i.e. will not move with respect to the crankshaft on operation.

The second counterweights 21, formed integrally with the crankshaft, are optionally provided by a corresponding shape of the webs. In particular, the webs of the crankshaft may have protrusions, extending in plane perpendicular to the axis of the crankshaft from the basic form of the webs in a predefined direction, and therefore adding mass to the webs at a certain angular position. The second counterweights 21 can be manufactured together with the crankshaft by forging. Thereby, the second counterweights 21 may be an integral part of the forged structure of the crankshaft.

In the embodiment, only one single basic type of first counterweights, formed separately from the shaft, is used. In particular, all the first counterweights 20 are formed from the same basic type, i.e. from identical pre-products, for example produced by flame cutting or forging. Thereby, production costs can be reduced.

In a possible embodiment, all the first counterweights will also be identical when mounted on the crankshaft. In this case, the machining of the basic type will be the same for all the first counterweights, as well.

However, in a preferred embodiment, some of the first counterweights, even though they are from the same basic type, will have a different mass. This may be optionally provided by removing material from the basic type of the counterweight, in order to provide at least one first counterweight having a reduced mass with respect to another first counterweight. The material removal may for example be provided by drilling and/or milling of the basic counterweight type, for example for providing a hole in the counterweight.

In a possible embodiment, the reduction of the mass of at least one of the first counterweights can be provided while the counterweight is not yet mounted onto the shaft.

However, in a preferred embodiment, the reduction of the mass is performed while the counterweight is already connected to the crankshaft.

Such material removal for reducing the mass of at least one of the first counterweights can for example be performed on a measuring station used for measuring unbalance. In particular, the crankshaft may be mounted on a measuring station for measuring unbalance, and in a first step, the mass of at least one of the counterweights may be reduced by a predetermined amount with respect to another counterweight of the same basic type by material removal. Then, in a second step, the unbalance of the crankshaft is measured and removed. The removal of the measured unbalance can equally be performed by reducing the mass of one or more counterweights or webs by material removal. In a preferred embodiment, the material removal of the first step, for reducing the mass of at least counterweight by predetermined amount, and the material removal of the second step, for removing the measured unbalance, can be done by the same removal apparatus.

The reduction in mass of at least one counterweight in a first step is therefore by predetermined amount, determined in advance for a certain type of crankshaft, and therefore used for the production of all crankshafts of this type. In contrast, the mass removal of the second step, for removing measured unbalance, is done individually for each crankshaft.

The reduction of the mass of certain counterweights by material removal makes it possible to use only one basic types, but to provide at the same time first counterweights having different masses from such counterweights of the same basic type. Therefore, the freedom of choice with respect to the mass of the counterweights used for the balancing operation is enlarged. This is of course also the case if more than one basic type is used.

Because the second counterweights are formed integrally with the crankshaft, second counterweights having a different mass can be used. Therefore, there is a large freedom in choosing the specific mass values of the second counterweights, because they can be chosen individually for each web or crank during the design of the crankshaft and will simply be integrated in the forging form of the shaft.

However, such counterweights formed integrally with the shaft can only be formed up to a certain maximum mass. If a larger mass is necessary for a counterweight, counterweights formed separately from the crankshaft and connected to the crankshaft have to be used. The present invention therefore is able to combine both counterweights having large masses and counterweights having low masses, while considerably reducing the production costs by using both counterweights being formed separately, and counterweights being formed integrally with the crankshaft.

In most embodiments, the mass of the first counterweights, formed separately from the crankshaft, will be higher than the mass of the second counterweights, formed integrally with the crankshaft. In particular, according to the invention, the mass of the second counterweights, formed integrally with the crankshaft, can be kept low, thereby reducing production costs.

For example, the first counterweight having the lowest mass of all the first counterweights may still have a mass that is at least 1.5 larger than the mass of the second counterweight having the largest mass among the second counterweights and optionally a mass that is at least two times larger. In the specific embodiment, it is about five times larger.

Optionally, the difference in weight between the first counterweights (of the same basic type) is relatively low, and optionally below 20 percent, or below 15 percent of the mass of the heaviest first counterweight. In the embodiment, the mass difference between the heaviest and the lightest first counterweight is around 7 percent.

If several basic types of first counterweights are used, these numbers may apply to first counterweights made from the same basic type, while the mass of counterweights made from different basic types may differ considerably more.

For second counterweights, formed integrally with the crankshaft, there is no necessary limitation with respect to the difference in mass between the different second counterweights with respect to their manufacture. However, in many applications, improved balancing will be provided if the difference between the masses of the second counterweights is equally rather low. In particular, the difference may be below 30 percent, optionally below 20 percent of the mass of the heaviest second counterweight. In the embodiment, it is at around 10 percent.

Figure 3:
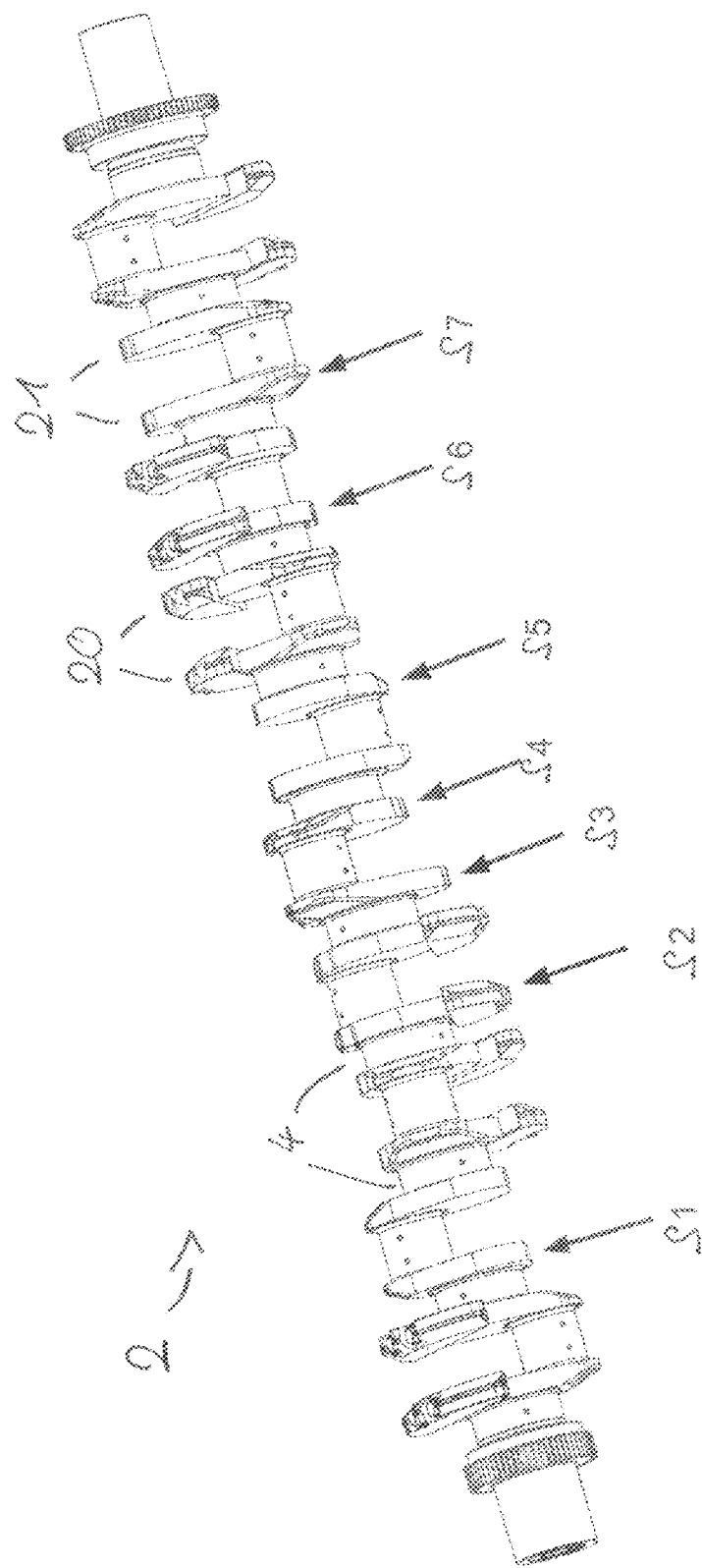
Figure 4:
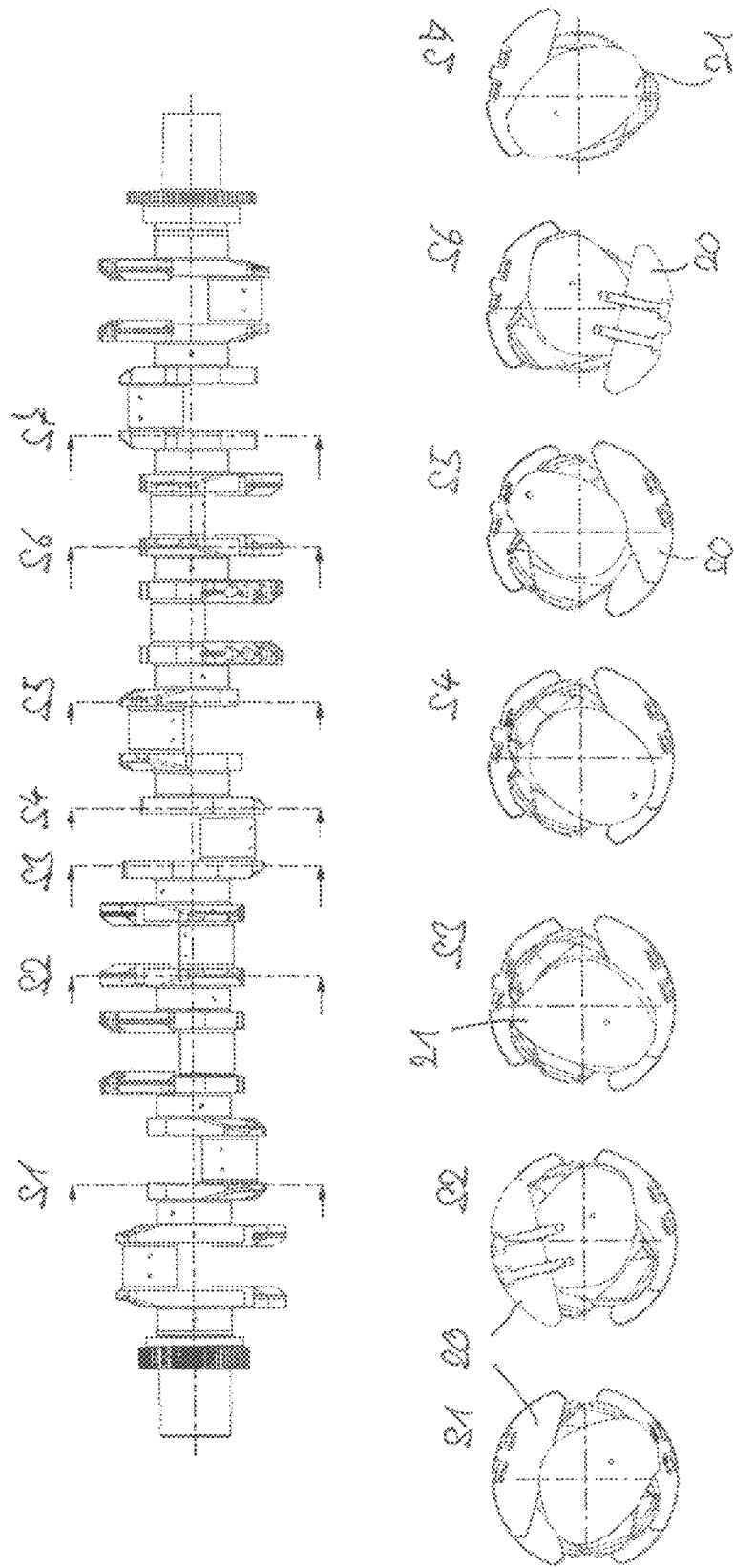
FIG. 4: A side view of the crankshaft shown in FIG. 3, along with cuts S1 to S7 along planes perpendicular to the axis of the crankshaft, at the positions indicated in FIGS. 3 and 4, FIG. 5: Cuts S1 to S3 in enlarged views also showing the main bearing journals and the crank pins.
Figure 6:
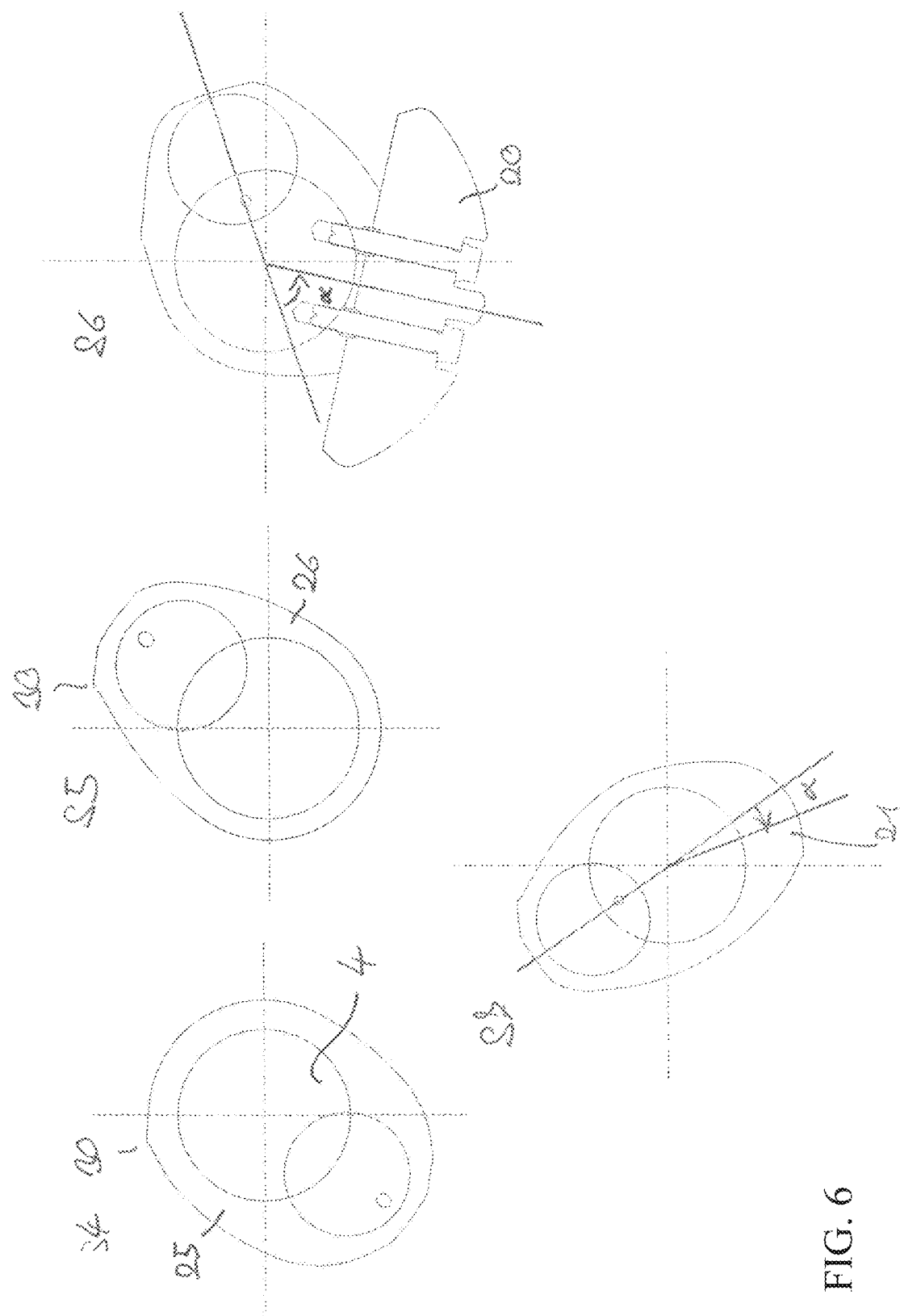
FIG. 6: Cuts S4 to S7 in an enlarged view also showing the main bearing journals and the crank pins.
Figure 7:
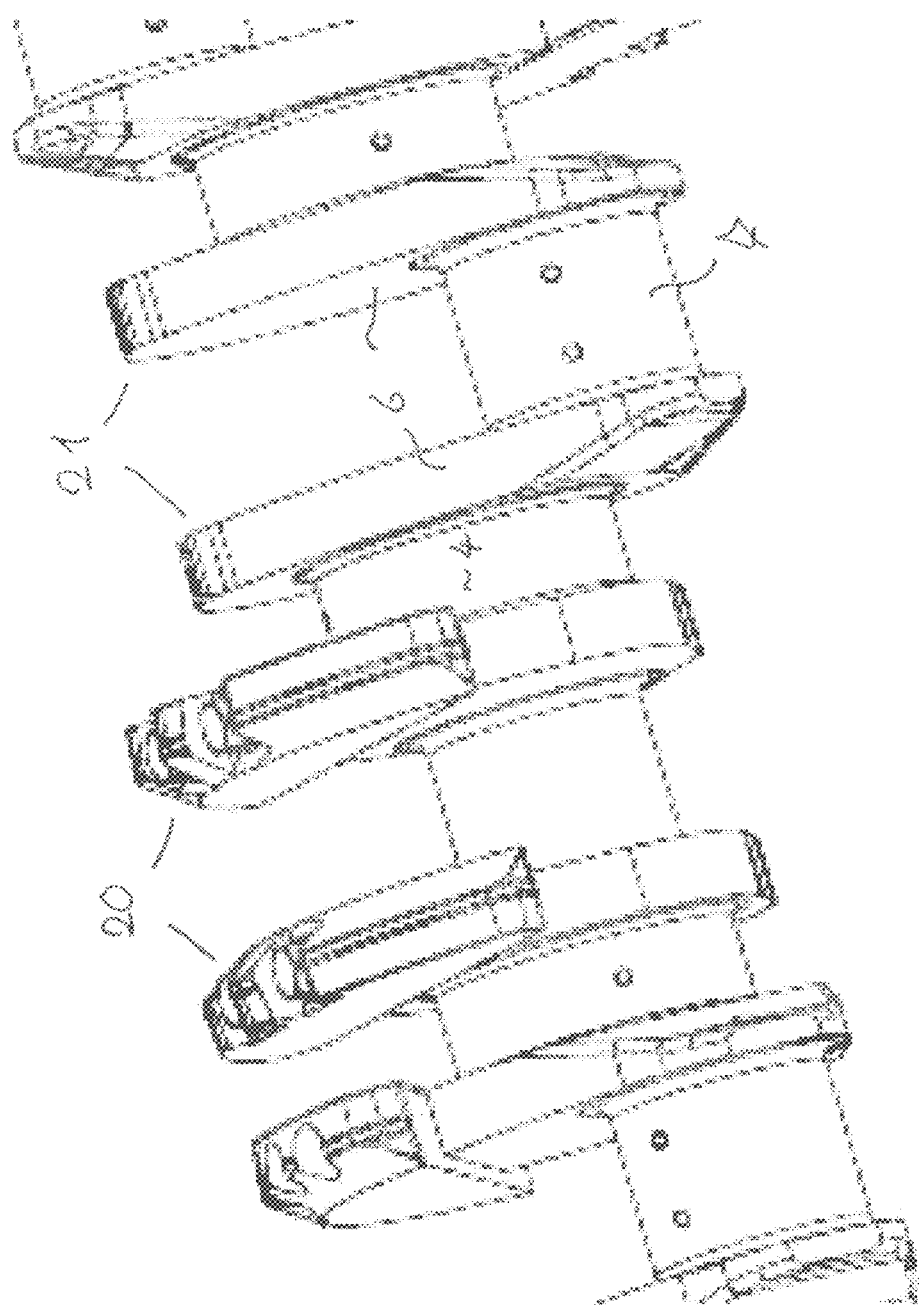
FIG. 7: An enlarged view of a detail of the embodiment shown in FIG. 3, showing webs of the crankshaft having counterweights formed separately and connected to the webs, and other webs having counterweights formed integrally with the webs.
Figure 8:
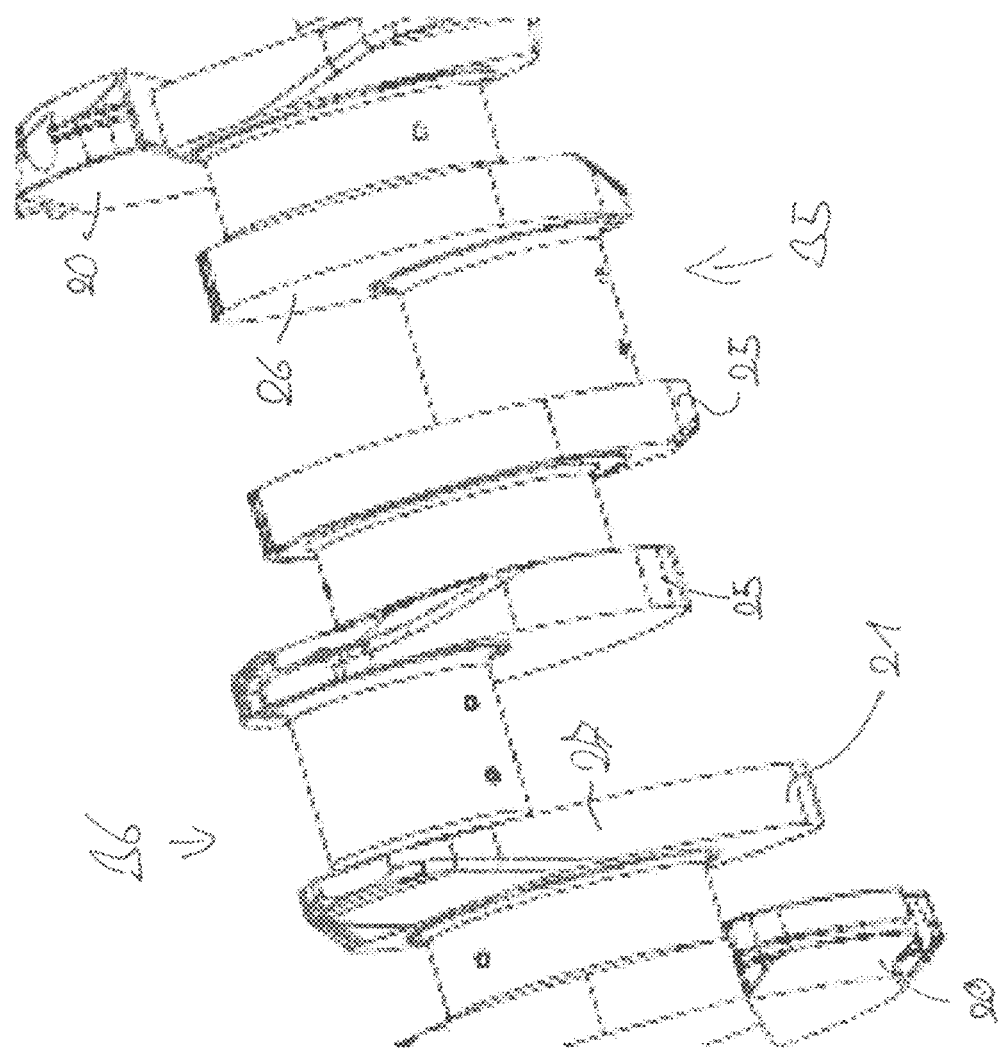
FIG. 8: An enlarged view of another detail of the embodiment shown in FIG. 3, showing a crank having one web with a counterweight, and one web without a counterweight, and showing webs acting as an axial thrust bearing.

As can be seen from FIGS. 3 and 8, as well as cuts S4 and S5 in FIGS. 4 and 6, not all the cranks and not all the webs have to be provided with counterweights. In particular, some of the cranks or some of the webs may have no counterweights at all. In this respect, we note that the small spikes 30, visible in cuts S4 and S5, do not constitute counterweights, but stem from the forging form used for producing the crankshaft. Therefore, in the context of the present invention, irregularities of the shape of the webs that have a mass that is below 10 percent and optionally below 5 percent of the mass of the heaviest second counterweight, formed integrally with the crankshaft, will not be regarded as counterweights in the sense of the present application.

In the embodiment of the present application, the two webs 25, arranged next to the middle plane of the crankshaft, are webs that do not have a counterweight. A cut through such a web 25 is shown as S4 in FIG. 6.

Further, as can be seen from FIGS. 3 and 8, both webs of crank 35 of the crankshaft both do not have counterweights. In particular, this crank 35 is arranged next to the center plane of the crankshaft, as shown in FIGS. 3 and 8.

In contrast, crank 36 has webs 25 and 27, one of which does not have a counterweight, while the other web 27 does have a counterweight 21 formed integrally with the web. In the embodiment, this crank is arranged next to the center plane of the crankshaft. In the embodiment, crank 36 having one web without a counterweight and one web 27 with a second, integrally formed counterweight is arranged opposite to the crank 35 having two webs 25 and 26 without counterweights, with respect to the center plane of the crankshaft.

As can be seen from FIG. 6 and cuts S4 and S5, the two webs 25 and 26 of crank 35, even though they both do not have counterweights, do not have the same shape. This is because the webs 25 are used as an axial thrust bearing, and therefore have a ring shape with an enlarged diameter around the crankshaft 4 with respect to the web 26, which has the basic shape of the webs used for this crankshaft type.

In the embodiment, the two webs 25 are arranged next to the central plane of the crankshaft on opposite sides of the center plane.

According to a second aspect of the present invention, the counterweights are provided on the crankshaft at different angles with respect to a position opposite the crank pin 7 of the corresponding crank.

For example, as can be seen from a comparison of cuts S1 and S3 in FIG. 3, the angle $\alpha$ at which the counterweights 21 are provided on the two webs with respect to plane 40 passing through the axis of the crankshaft and the axis of the crank pin differ between the two counterweights. Therefore, at least one of the angles $\alpha$ is non-zero. Optionally, there are at least two counterweights provided at a different, non-zero angles $\alpha$.

Providing the counterweights at different angles $\alpha$ with respect a position opposite to the crank pin of the corresponding crank will provide an additional degree of freedom that will help to improve the balancing of the crankshaft.

In contrast, U.S. Pat. No. 9,482,307 B2, showing a V-20-engine, provides the counterweights in the same direction opposite the crank pin, and therefore needs movable counterweights in order to provide a global balancing.

The inventors of the present invention have realized that in particular for engines having at least one cylinder bank with at least 10 cylinders, and in particular for engines in a V-configuration, this approach provides serious advantages, because it allows to reduce the severe torsional loads which are generally observed with such long crankshafts.

Optionally, in addition to providing the counterweights at different angles with respect to a position opposite the crank pin on the crankshaft, counterweights having different masses are used on the crankshaft.

The position and masses of the counterweights can be determined in an optimization procedure where the whole crankshaft is considered at the same time regarding the inner bending moments induced by the rotating masses. By providing counterweights that differ in mass and angular position, an increase of torsional eigenfrequencies is achieved compared to a balancing approach where each crank is balanced individually or where identical angular positions and/or masses are used for the cranks.

According to the present invention, the angles of the counterweights with respect to a position opposite the corresponding crank pin may vary considerably between the different cranks. In particular, the absolute angle with respect to a position opposite the crank pin of the corresponding crank may be larger than 10 percent, optionally larger than 20 percent, or optionally larger than 40 percent at least for one crank and counterweight. For example, the absolute angle may be, for some counterweights, between 50 and 60 degrees.

Further, the difference between the angles at which two counterweights are provided on the crankshaft with respect to their respective position opposite the crank pin of the corresponding crank may also be considerable. For example, it might be larger than 20 percent, optionally larger than 40 percent, or optionally larger than 90 percent. In the embodiment, the maximum difference may be between 100 degrees and 120 degrees.

Further, we note that some of the angles $\alpha$ may be in a range between 5 and 25, optionally between 10 and 20 degrees, such as the angle $\alpha$ in cut S7. Other angles $\alpha$, such as the ones shown in cuts S2 and S3, may be between 30 degrees and 80 degrees, optionally between 40 degrees and 70 degrees.

We note that the two aspects of the present application are optionally combined. Therefore, both first and second counterweights are used, and the angles and/or masses of the counterweights differ.

In the embodiment, the angles between at least two first counterweights, formed separately from the crankshaft, differ between each other. This can be provided by providing the respective webs with a connecting portion for the counter-weight at a different angular position between the two webs, as can be seen by comparing cuts S2 and S6. Therefore, the same basic type of counterweights can be used in both webs, which are however mounted at different angular positions on the corresponding webs.

For this purpose, the first counterweights 20 optionally have an outer circumference 22 that is formed in parts by a circular ark. In particular, the center of the ark may be arranged at the rotation axis of the crankshaft. Thereby, independently from the angular position at which the first counterweight is mounted to the crankshaft, the circle of rotation of the circumference of the counterweight will be the same. This circle of rotation and therefore the radius of the circular ark is optionally determined to be lower than the lowest position of the piston relative to the crankshaft. Thereby, independently of the angle at which the counterweight is mounted to the crankshaft, a collision will be avoided.

The outer circumference of the counterweight does not form a complete circle, but only is provided by one or more sections of a circle. However, the other parts of the circumference of the counterweights will not go beyond the radius of these circular parts, but will have a reduced diameter with respect to these. In particular, this can be seen for example in cut S2, where the circular parts 22 are interrupted by portions 23 having a reduced outer edge, for placing the bolts or screws 23.

Optionally the counterweights 20 will be symmetric with respect to a radial plane. Therefore, the angular position of such a counterweight is defined by the angular position of its symmetry plane.

For non-symmetric counterweights, the angular position of the counterweight on the shaft is defined as the angular position of the center of weight of the counterweight.

This definition also applies to the second counterweights 21, formed integrally with the crankshaft. The second counterweights formed integrally with the crankshaft may have an asymmetric shape, or may have a symmetric shape.

Further, the angular position may also differ between the different second counterweights. Further, the angular position between the first and second counterweights may differ.

The present invention allows to reduce the cost in the manufacturing of the crankshaft, while at the same time optimizing the rotational inertia, improving torsional dynamics, reducing main bearing loads etc.

In a first aspect, a combination of counterweights formed integrally with the crankshaft, and of counterweights formed as separate elements and fixed to the crankshaft, is used.

In one embodiment, only one basic type of counterweights formed separately is used. However, in order to respect this constraint, some of the counterweights formed separately from the same basic type will be reduced in weight by material removal to a default value.

Further, the counterweights formed integrally with the crankshaft are optimized to have a low mass, in order to simplify integration, in particular by integrating their formation to the forging process of the crankshaft.

In a second aspect, the centrifugal forces generated by the cranks are compensated globally and not locally, wherein the angular orientation of the counterweights is used as a degree of freedom to balance the crankshaft. Further, not all the cranks have to be provided with counterweights and the mass of the counterweights can equally be used as a degree of freedom.

In principle, both the angular position and the mass of the counterweights provided for the two webs of each crank could differ between each other for all the cranks. However, for most applications, the balancing will be better if at least for some cranks, both webs of at least some of the cranks will be provided with identical counterweights, i.e. counterweights having the same weight and the same angular position. In the embodiment, all the cranks having counterweights but one will have identical counterweights on both of their webs at identical positions.

We finally note that the angular distribution of the counterweights (with respect to a position opposite the respective crank pin) will generally be asymmetric with the respect to the central plane of the crankshaft. For an asymmetric crankshaft, this is already due to the asymmetry of the angular distribution of the cranks. However, also for symmetric crankshafts, the mass distribution and/or angular distribution of the counterweights will usually not be symmetric, but asymmetric. This will in particular apply if in the global approach for balancing the crankshaft will not only take into account the crankshaft itself, but also loads external to the crankshaft, such as the flywheel and the rotational damper, because these external loads will usually be asymmetric with respect to the center plane of the crankshaft.

The invention claimed is:

1. An internal combustion engine comprising:
   a crankshaft, the crankshaft comprising main bearing journals and cranks for connecting the crankshaft to piston rods of the engine,
   wherein the crankshaft is provided with counterweights, wherein at least a first counterweight is formed as a separate element and connected to the crankshaft,
   wherein at least a second counterweight is formed integrally with the crankshaft,
   wherein at least two counterweights having a different mass are provided, and
   wherein at least one counterweight has a mass that is between 1.5 and 20 times as large as the mass of another counterweight, and/or
   the mass of a two first counterweights each formed as separate elements differs by more than 1% and less than 20%, wherein the difference in mass is provided by material removal from a common basic counterweight type, and/or the mass of two second counterweights each formed integrally with the crankshaft differs by more than 1% and/or less than 25%, of the mass of the heavier of the two second counterweights.

2. The internal combustion engine of claim 1, wherein only one basic type of first counterweights formed as a separate element is used in the engine, wherein the mass of at least one of the first counterweights is modified with respect to another first counterweight by material removal from a common basic type and/or wherein the basic type is formed by flame cutting or forging.

3. The internal combustion engine of claim 1, wherein at least two different second counterweights formed integrally with the crankshaft are used in the engine, in particular at least two second counterweights having a different weight and/or weight distribution.

4. The internal combustion engine of claim 1, wherein at least one counterweight is arranged on the crank shaft with a non-zero angle with respect to a position opposite the crank pin of the corresponding crank, and/or wherein at least two counterweights are provided on the crankshaft at different, non-zero angles with respect to a position opposite the crank pin of the corresponding crank.

5. The internal combustion engine of claim 1, wherein the first counterweights are fixedly attached to the crank shaft, and/or wherein the second counterweights are integrally formed with the crank shaft during the forging process of the crank shaft.

6. The internal combustion engine of claim 1, wherein the first counterweights have an outer circumference that is formed in parts by a circular arc, with the center of the arc being arranged at the rotation axis of the crankshaft and the radius being determined by the lowest position of a piston relative to the crankshaft, wherein the first counterweights are mirror symmetric with respect to a center plane extending in an axial direction of the crank shaft and/or wherein the circular arc is interrupted by at least one recess for a screw and/or bolt head.

7. The internal combustion engine of claim 1, comprising an even number of cylinders arranged in a V-configuration, wherein two pistons of a V-segment are connected to the same crank, and/or wherein the crankshaft is of the asymmetric type, and/or comprising at least 12 cylinders, and/or wherein the displacement volume per cylinder is between 1 l and 20 l.

8. An internal combustion engine, comprising at least 20 cylinders, arranged in a V-configuration, the internal combustion engine further comprising a crankshaft, the crankshaft comprising main bearing journals and cranks for connecting the crankshaft to piston rods of the engine,
wherein the crankshaft is provided with counterweights,
wherein at least two counterweights are provided on the crankshaft at different, non-zero angles with respect to a position opposite the crank pin of the corresponding crank.

9. The internal combustion engine of claim 8, wherein at least one counterweight is arranged on the crank shaft with an absolute angle with respect to a position opposite the crank pin of the corresponding crank that is larger than 10 degrees, and/or wherein a difference between the angles at which two counterweights are provided on the crankshaft with respect to a position opposite the crank pin of the corresponding crank is larger than 20 degrees, and/or wherein at least one counterweight is arranged on the crank shaft with an absolute angle with respect to a position opposite the crank pin between 5 degrees and 25 degrees, and at least one other counterweight is arranged on the crank shaft with an absolute angle with respect to a position opposite the crank pin between 30 degrees and 80 degrees.

10. The internal combustion engine of claim 8, wherein at least two counterweights having a different mass are provided, and
wherein at least one counterweight has a mass that is between 1.5 and 20 times as large as the mass of another counterweight, and/or
the mass of a two first counterweights each formed as separate elements differs by more than 1% and less than 20%, wherein the difference in mass is provided by material removal from a common basic counterweight type, and/or
the mass of two second counterweights each formed integrally with the crankshaft differs by more than 1% and/or less than 25%, of the mass of the heavier of the two second counterweights.

11. The internal combustion engine of claim 8, wherein at least one crank has counterweights of the same weight and/or angular position on its two webs, and/or wherein there is at least one web and/or at least one crank that does not have a counterweight.

12. The internal combustion engine of claim 8, wherein at least one crank has a first web provided with a counterweight and a second web provided without a counterweight or with a counterweight having a different mass and/or angular position, the first and the second web carrying a crank pin, wherein the counterweight or counterweights provided on the first/or and second web are formed integrally with the crank shaft.

13. The internal combustion engine of claim 8, wherein at least a first counterweight is formed as a separate element and connected to the crankshaft and at least a second counterweight is formed integrally with the crankshaft.

14. A method for producing a crankshaft of a combustion engine, wherein at least two counterweights of the same basic type are formed as separate elements and connected to the crankshaft, comprising:
in a first step, mass of at least one of the counterweights is reduced by a predetermined amount with respect to another counterweight of the same basic type by material removal, and
in a second step, the unbalance of the crankshaft is measured and removed.

15. The method of claim 14, wherein the mass of at least one of the counterweights is reduced by the predetermined amount by material removal while the crank shaft is mounted on a measuring station for measuring unbalance.

16. The method of claim 14, wherein the material removal of the first step is done by a removal apparatus that is used in the second step for removing a measured unbalance.

17. The method of claim 14, wherein the mass of at least one of the counterweights is reduced by a predetermined amount by material removal while the counter weight is already attached to the crankshaft.

18. The method of claim 14, wherein the mass of at least one of the counterweights is reduced by a predetermined amount by material removal while the counterweight is already attached to the crankshaft.

19. The method of claim 14, wherein the mass of at least one of the counterweights is reduced such that it differs by more than 1% and less than 20% from the mass of at least one other counterweight.

20. An internal combustion engine, comprising:
a crankshaft, the crankshaft comprising main bearing journals and cranks for connecting the crankshaft to piston rods of the engine, wherein the crankshaft is provided with counterweights,
wherein at least a first counterweight is formed as a separate element and connected to the crankshaft,
wherein at least a second counterweight is formed integrally with the crankshaft, and
wherein at least two first counterweights each formed as a separate element are connected to the crankshaft at different, non-zero angles with respect to a position opposite the crank pin of the corresponding crank, and/or wherein at least two second counterweights are formed integrally with the crankshaft at different, non-zero angles with respect to a position opposite the crank pin of the corresponding crank, and/or wherein a first counterweight formed as a separate element is connected to the crankshaft at a first, non-zero angle with respect to a position opposite the crank pin of the corresponding crank, and at least a second counterweight is formed integrally with the crankshaft at a second, non-zero angle with respect to a position opposite the crank pin of the corresponding crank, wherein the first and the second angle differ from each other.

* * * * *